(12) United States Patent
Baker (10) Patent No.: US 6,999,574 B2
(45) Date of Patent: Feb. 14, 2006

(54) TECHNIQUE FOR ASSESSING CHARGES FOR A TELECOMMUNICATION SERVICE INCLUDING INFORMATION ASSISTANCE

(75) Inventor: Nathan Bryant Baker, Tigard, OR (US)

(73) Assignee: Metro One Telecommunications, Inc., Beaverton, OR (US)

(*) Notice: Subject to any disclaimer, the term of this patent is extended or adjusted under 35 U.S.C. 154(b) by 355 days.

(21) Appl. No.: 10/610,737

(22) Filed: Jun. 30, 2003

(65) Prior Publication Data

US 2005/0018829 A1   Jan. 27, 2005

Related U.S. Application Data

(63) Continuation-in-part of application No. 10/366,816, filed on Feb. 14, 2003, which is a continuation-in-part of application No. 10/313,712, filed on Dec. 6, 2002, which is a continuation-in-part of application No. 10/201,236, filed on Jul. 22, 2002, which is a continuation-in-part of application No. 09/520,306, filed on Mar. 7, 2000, now abandoned.

(60) Provisional application No. 60/414,965, filed on Sep. 30, 2002.

(51) Int. Cl.
*H04M 3/42* (2006.01)

(52) U.S. Cl. ............................... 379/218.01; 379/114.01

(58) Field of Classification Search .......... 379/114.01, 379/114.03, 114.06, 126, 127.01, 211.01, 379/211.02, 218.01
See application file for complete search history.

(56) References Cited

U.S. PATENT DOCUMENTS

| | | | | | |
|---|---|---|---|---|---|
| 5,850,433 | A | * | 12/1998 | Rondeau | 379/218.01 |
| 5,926,754 | A | * | 7/1999 | Cirelli et al. | 455/417 |
| 6,381,325 | B1 | * | 4/2002 | Hanson | 379/218.01 |
| 6,404,876 | B1 | * | 6/2002 | Smith et al. | 379/218.01 |
| 6,404,877 | B1 | * | 6/2002 | Bolduc et al. | 379/218.01 |
| 6,459,779 | B1 | * | 10/2002 | Wardin et al. | 379/112.01 |
| 6,473,612 | B1 | * | 10/2002 | Cox et al. | 455/414.2 |
| 6,628,772 | B1 | * | 9/2003 | McGrath et al. | 379/218.01 |
| 6,636,590 | B1 | * | 10/2003 | Jacob et al. | 379/114.05 |
| 6,639,975 | B1 | * | 10/2003 | O'Neal et al. | 379/112.01 |
| 6,721,401 | B1 | * | 4/2004 | Lee et al. | 379/93.17 |

* cited by examiner

*Primary Examiner*—Bing Q. Bui
(74) *Attorney, Agent, or Firm*—Kaye Scholer LLP (57) ABSTRACT

A call to an information/call center is assigned a call sequence number. Call segments associated with the call sequence number are bundled as a single call session. A call session begins with the connection between the caller and the information/call center, and continues until that connection is torn down. Call segments are realized when connections are made or torn down between the information/call center and called parties. Each call is billed per call session, not per call segment. Call charges for each call session are determined, as are taxes allocated to one or more call segments.

27 Claims, 5 Drawing Sheets

|   | Call Activity | Length (mm:ss) | Prior Art billing | 1-second billing | 1-second billing | 6-second billing | 30-second billing |
|---|---|---|---|---|---|---|---|
| | | | | Type of Billing | | | |
| (a) | Information Assistance (Portland) | 00:26 | Flat | 00:26 | 00:26 | 00:30 | 00:30 |
| (b) | Call complete to Portland | 06:53 | 07:00 | 06:53 | 06:53 | 06:54 | 07:00 |
| (c) | StarBack to Information Assistance | 04:42 | Flat | 04:42 | 00:00 | 00:00 | 00:00 |
| (d) | Customer Service (New Orleans) | 09:51 | 00:00 | 09:51 | 00:00 | 00:00 | 00:00 |
| (e) | StarBack to Information Assistance | 00:25 | Flat | 00:25 | 00:25 | 00:30 | 00:30 |
| (f) | Call complete to New York | 08:38 | 09:00 | 08:38 | 08:38 | 08:42 | 09:00 |
| (g) | StarBack to Information Assistance | 0:22 | Flat | 00:22 | 00:22 | 00:24 | 00:30 |
| (h) | TOTAL TIME | 31:17 | N/A | 31:17 | 16:44 | 17:00 | 17:30 |
| (i) | TOTAL TIME CHARGED | | 07:00 09:00 4 flat fees | 32:00 | 17:00 | 17:00 | 18:00 |
| (j) | TOTAL CHARGE | | varies | $1.74 | $0.99 | $0.99 | $1.04 |
| | | ↑ 510 | ↑ 520 | ↑ 530 | ↑ 540 | ↑ 550 | ↑ 560 |

FIG. 5

|   | Call Activity | Length (mm:ss) | Prior Art | | Invention | | |
|---|---|---|---|---|---|---|---|
|   |   |   | Separate billing | Tax type | 30-second billing | Tax type | Tax allocation |
| (a) | Information Assistance (Portland) | 00:26 | Flat | Intrastate | 00:30 | Intrastate | $1.04 * $\frac{7.5}{17.5}$ * intrastate rate |
| (b) | Call complete to Portland | 06:53 | 07:00 | Intrastate | 07:00 | | |
| (c) | StarBack to Information Assistance | 04:42 | Flat | Interstate | 00:00 | Interstate | $0.00 |
| (d) | Customer Service (New Orleans) | 09:51 | 00:00 | Interstate | 00:00 | | |
| (e) | StarBack to Information Assistance | 00:25 | Flat | Interstate | 00:30 | Interstate | $1.04 * $\frac{9.5}{17.5}$ * interstate rate |
| (f) | Call complete to New York | 08:38 | 09:00 | Interstate | 09:00 | | |
| (g) | StarBack to Information Assistance | 0:22 | Flat | Intrastate | 00:30 | Deregulated | $1.04 * $\frac{0.5}{17.5}$ * deregulated rate |
| (h) | TOTAL TIME | 31:17 | | | 17:30 | | |
| (i) | TOTAL TIME CHARGED | | | | 18:00 | | |
| (j) | TOTAL CHARGE | | | | $1.04 | | |

FIG. 6

TECHNIQUE FOR ASSESSING CHARGES FOR A TELECOMMUNICATION SERVICE INCLUDING INFORMATION ASSISTANCE

The present application is a continuation-in-part of U.S. application Ser. No. 10/366,816, filed Feb. 14, 2003, which is a continuation-in-part of (a) U.S. application Ser. No. 10/313,712, filed Dec. 6, 2002, which claims the benefit of U.S. Provisional Application Ser. No. 60/414,965, filed Sep. 30, 2002, and (b) U.S. application Ser. No. 10/201,236, filed Jul. 22, 2002, which is a continuation-in-part of U.S. application Ser. No. 09/520,306, filed Mar. 7, 2000 now abandoned. All of these applications from which priority is claimed are hereby incorporated herein by reference.

BACKGROUND OF THE INVENTION

The invention relates generally to an information assistance system and method. More specifically, the invention relates to a system and method for providing information assistance and telephone service.

In a typical directory assistance call of the past, a caller would identify to an operator the name and address of a party whose telephone number was desired. In response, the operator would locate the desired destination telephone number and provide it to the caller. The caller would disconnect from directory assistance and then dial the destination number on his/her own. The directory assistance call was either free or was charged a flat rate, regardless of the length of the call. The resulting call to the destination number was charged as a regular call according to the caller's calling plan (e.g., payphone call, pay-per-minute, pay-per-call, or unlimited calling), the carrier, and whether the call was local or long distance. This call sequence included two distinct calls, with each one priced separately.

More recently, directory assistance companies have offered callers an option to be automatically connected to the destination number without first terminating the directory assistance call. Generally, the caller is charged a fee for accepting this option. However, even though the caller does not have to disconnect from directory assistance, the call sequence is charged to the customer as if two calls had been made—one to directory assistance and one to the destination number, with the connection fee being typically added to the directory assistance charge. One reason for this continued, separate billing is that the directory assistance provider is often different from (i.e., unaffiliated with) the carrier providing the telecommunication service. In addition, the charge for the directory assistance call (and the connection fee, if any) may be a flat fee, regardless of how long the caller is connected to directory assistance, whereas the resulting call to the destination party (e.g., if it is long distance) is typically charged based on its duration.

Figure 1:
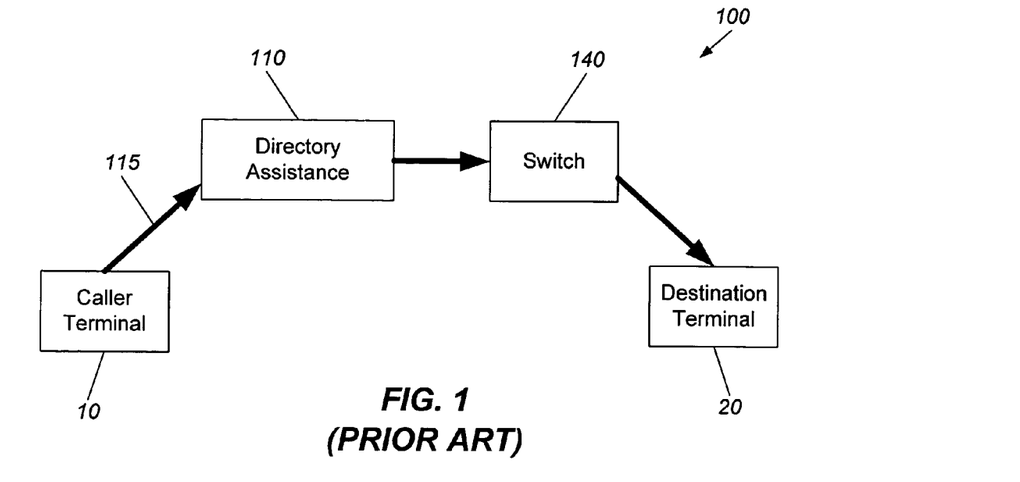
FIG. 1 illustrates a prior art system for connecting a caller terminal to a destination terminal.

Another reason calls are separately billed is illustrated in FIG. 1, which shows prior art arrangement 100. Arrangement 100 includes directory assistance 110, switch 140, caller terminal 10, and destination terminal 20. The caller calls directory assistance 110 and caller terminal 10 is connected over connection 115. The caller requests the number of a destination party (located at destination terminal 20) and the operator looks up the number. If the caller elects for the operator to complete the call (rather than hanging up from the operator and calling himself), directory assistance 110 connects caller terminal 10 to destination terminal 20 via switch 140, which typically is part of a carrier network. When the call to destination terminal 20 is finished, both the caller and the destination party hang up. The carrier network bills the directory assistance service for the connection from directory assistance 110 to destination terminal 20, and the directory assistance service in turn passes the cost of the connection to the caller as part of the directory assistance service charge.

An advance over this directory assistance scenario is found using, e.g., the StarBack® feature. As described in U.S. Pat. No. 5,797,092, StarBack® allows a caller, after being connected to a desired party, to be connected back to directory assistance by pressing a designated key (such as the "Star" (*) key) on the caller's telephone. If the caller desires to make another call after finishing a conversation with a first destination party, the caller invokes StarBack® and is redirected to directory assistance 110. If the caller has directory assistance connect him to a second destination party, directory assistance 110 connects the caller to another destination terminal via switch 140 or another carrier switch. When the call to the second destination party is finished, the caller and the second destination party may both hang up or the caller could again invoke StarBack®. Each call completed through switch 140 is considered by the carrier to be a different call, because the carrier does not track the origins of the call. Thus, each call is billed separately, as is the directory assistance call itself.

Information assistance is an extension of directory assistance. In addition to finding a destination number and connecting a caller terminal to the associated destination terminal, information assistance operators can provide concierge-type services such as a restaurant guide and reservation service, event ticketing and reservation service, hotel reservation and availability service, travel or flight reservation and ticketing services, ordering specific items such as flowers or food delivery, arranging transportation, and accessing entertainment guides. The use of information assistance to provide such concierge-type services is disclosed in, e.g., commonly-assigned, co-pending U.S. application Ser. No. 09/520,306, "Technique for Providing Information Assistance Including Concierge-Type Services," filed Mar. 7, 2000, incorporated herein by reference.

In addition, if a caller subscribes to an information assistance service, the caller may have one or more user profiles on file with the service that includes information pertaining to and about the caller, including his/her preferences. Such information may include a list of contacts (i.e., a personal phone directory), a schedule of appointments, to-do lists, notes, and personal preferences about such topics as restaurants, movies, sporting events, or hobbies. The caller may access the information assistance service in order to connect to a contact, retrieve an appointment or to-do list item, set up a new appointment or to-do list item, or request information about a restaurant, movie, or sporting event falling within the caller's personal preferences. The information assistance service may connect the caller to the contact or restaurant, or may make reservations at the restaurant or movie or sporting event as desired by the caller. The use of information assistance to provide these types of information management services is disclosed in, e.g., U.S. Pub. No. 2002/0055351 A1, published May 9, 2002, incorporated herein by reference.

Moreover, a caller may have a question regarding his or her information assistance services bill or a related question, which can be directed to customer service rather than to information assistance. For callers' convenience, the information assistance service provider may have one contact number for all of its services, typically a directory-assistance-type number that is easy for customers to remember.

Thus, a call from a caller to an information assistance service may involve all of these activities (directory assistance, concierge-type services, information management services, customer service) as well as connecting calls to destination numbers. In addition, using a feature such as StarBack®, the caller may engage in a series of calls with the operator and with destination parties. Typically, perhaps because of the history of billing directory assistance separately from the connecting calls, each of these separate activities is billed separately, even though the caller does not hang up the handset between each activity.

U.S. application Ser. No. 10/366,816, filed Feb. 14, 2003, incorporated herein by reference, discloses billing such calls together as a single, bundled call. As disclosed in that application, the bundled call is part of an enhanced telecommunication (telecom) service concept. Instead of having each part of a call billed separately, such a call is billed as a single call, e.g., on a per-minute basis (e.g., 9¢/min.), on a per-call basis (e.g., $2.00/call), or on a hybrid basis (e.g., $1.00 for first 15 minutes, 5¢/min thereafter).

SUMMARY OF THE INVENTION

The invention builds on the bundled-call concept found in the aforementioned patent application. The invention further embraces the concept of billing based on events occurring through the information assistance service provider rather than events occurring through the carrier switch. The invention agglomerates these events based on the continued existence of a connection between the caller and the information assistance service provider.

The present invention provides details of how the different activities within each of these calls are kept track of and how certain billing situations, not previously encountered under the prior non-bundled call concept, are handled.

The method includes receiving a call from a caller with an information service request. The call (or call session) has a call sequence number (CSN), which is made up of call detail records (CDR), where a CDR is generated for each task related to providing information assistance. Each call session is tracked using its CSN and is billed as a single call, even if the caller makes more than one connection to receiving parties.

The connections made during the call can be for directory assistance, information assistance, customer service, assistance with concierge-type activities, and connections to other parties. Each of these distinct connections is called a call segment.

In the prior art, each call segment was billed separately. The present invention associates call segments with the same identifier identifying the call (e.g., the CSN) and bundles the call segments together into a single, billed call session having that CSN. In order to handle call taxation, call segments are grouped into tax segments based on call segments completed to destination parties. The tax segment includes the call segment completed to the destination party and the immediately preceding information assistance service request call segment. Call segments to directory assistance not followed by a completed call to a destination party are considered as tax segments by themselves. The type of tax applied to a tax segment is based on the relative locations of the caller and the destination party. The amount of the tax applied to a tax segment is based on the ratio of the time accorded to the tax segment to the time for the entire call.

Advantageously, the inventive call segment bundling facilitates marketing and billing of telecommunication services, and may encourage subscribers to take advantage of information assistance services that they otherwise would not have used. Taxation allocation is handled effectively by the information assistance service provider in accordance with the invention.

BRIEF DESCRIPTION OF THE DRAWINGS

The accompanying drawings, in which like reference numerals represent like parts, are incorporated in and constitute a part of the specification. The drawings illustrate presently preferred embodiments of the invention and, together with the general description given above and the detailed description given below, serve to explain the principles of the invention.

DETAILED DESCRIPTION

The present invention is directed to assessing charges for an enhanced telecommunication service, which includes information assistance, on a session by session basis. In an illustrative embodiment of the invention, a "session" (sometimes referred to as a "call session" or simply as a "call" here) comprises a sequence of activities (or "events") between the time a caller picks up the handset to establish a connection to an information assistance service provider and the time the caller hangs up to disconnect from the service provider. Each session is assigned a call sequence number ("CSN"). Each of the activities at an information/call center during the call causes a call detail record ("CDR") to be generated. For example, upon receipt of an information assistance call, a servicing switch at the information/call center may generate a CDR to record the call receipt event. Each "event" during the course of the call may generate a CDR by a component of the information/call center involved in that event. An "event" may comprise any activity at the information/call center related to handling of the call. Examples of events include receiving an information assistance call, queuing a call while waiting for an operator to become available, connecting the call to an available operator, conducting a search of a database for directory assistance or other services, activating a voice response unit (VRU), connecting to a destination number, etc. Other examples include exercising the StarBack® feature, connecting to customer service (and returning to information assistance from customer service), and events occurring during customer service. Generating CDRs for such events is described, e.g., in commonly assigned, copending U.S. application Ser. No. 09/777,061, filed Feb. 5, 2001, and U.S.

application Ser. No. 10/425,314, filed Apr. 29, 2003, both of which are incorporated herein by reference.

Figure 2:
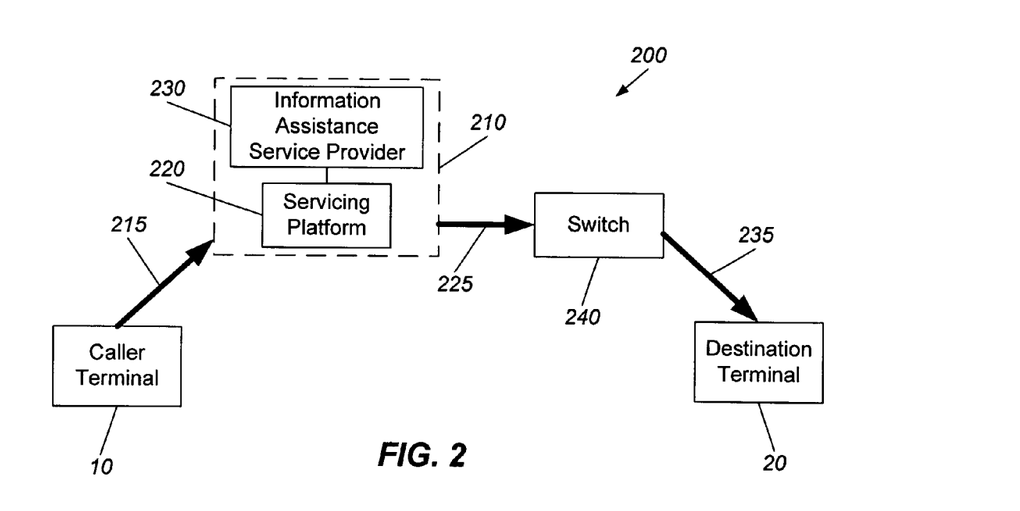
FIG. 2 illustrates a system for connecting a caller terminal to a destination terminal via an information assistance service provider in accordance with an embodiment of the present invention.

The generation of CDRs and their linking to a call sequence number allows billing of a call based on events occurring through the information assistance service provider rather than events occurring through carrier switch 140 as in prior art. The invention agglomerates these events based on the continued existence of connection 215 between the caller and the information assistance service provider.

The callers (also referred to as "users" or "subscribers") in this illustrative embodiment may be wireline (landline) telephone, wireless telephone, and other communications device (e.g., PDA) users. Information assistance services discussed include providing information management tools such as private directory, direct connect, calendaring, and user profile functions (collectively, "information management services") and concierge-type services as described below. Such information management services can be flexibly defined by users to effectively handle dynamic information. The latter may include, e.g., sales and price data that vary with time, and user profile preferences adjustable depending on different conditions, e.g., weekdays vs. weekends, daytime vs. evening, travel in business class vs. first class when one of the classes is full, and whether the user is in a roaming calling area.

FIG. 2 illustrates arrangement 200 in which a caller initiates a session from caller terminal 10 (e.g., by dialing 1-800-XXX-XXXX, 10-10-XXX-XXXX, 0, 00, 411, 555-1212, etc.), which is routed to information/call center 210 via one or more carrier switches in a carrier network, e.g., a public switched telephone network (PSTN), a wireless telephone network, etc. Caller terminal 10 may comprise a wireless telephone, wireline telephone, personal digital assistant (PDA), computer, or other communication device. In a typical information assistance call, a caller identifies to information service provider 230 including, e.g., an operator, the name and address (sometimes city or area code) of a party whose telephone number is desired. In response, the operator locates the desired destination telephone number using, e.g., a computer database. The destination number is then provided to the caller, e.g., by a computerized voice server which provides automated voicing of the number, and the caller is afforded an option to be connected to the destination number without first terminating the directory assistance call.

The connection between caller terminal 10 and information/call center 210 is denoted 215. Once the session begins, information/call center 210 assigns the session a call sequence number (CSN). Every activity during that call session generates a CDR associated with that CSN. The caller is connected to destination terminal 20 via switch 240 and connections 225 and 235. Switch 240 may be a carrier switch as in the prior art or may be a switch leased or owned by the information assistance service provider. If the caller desires to make another call after finishing a conversation with a first destination party, the caller may invoke the StarBack® feature, e.g., by pressing a "*" key on the phone, and is redirected to information assistance service provider 230. Connections 225 and 235 between information/call center 210 and switch 240 and destination terminal 20 are torn down, but connection 215 between caller terminal 10 and information/call center 210 remains intact. If the caller has information assistance service provider 230 connect him to a second destination party, information assistance connects the caller to another destination terminal via likely a different connection 225, different connection 235, and different switch 240. When the call to the second destination party is finished, the caller and the second destination party may both hang up or the caller could again invoke the StarBack® feature. If the caller invokes the StarBack® feature, the caller may request information assistance service provider 230 to connect to another destination party, to provide a concierge-type service or an information management service, or to connect to customer service, etc. Throughout this time, connection 215 remains intact. Only when the caller hangs up and connection 215 is torn down does the caller's session end.

Figure 3:
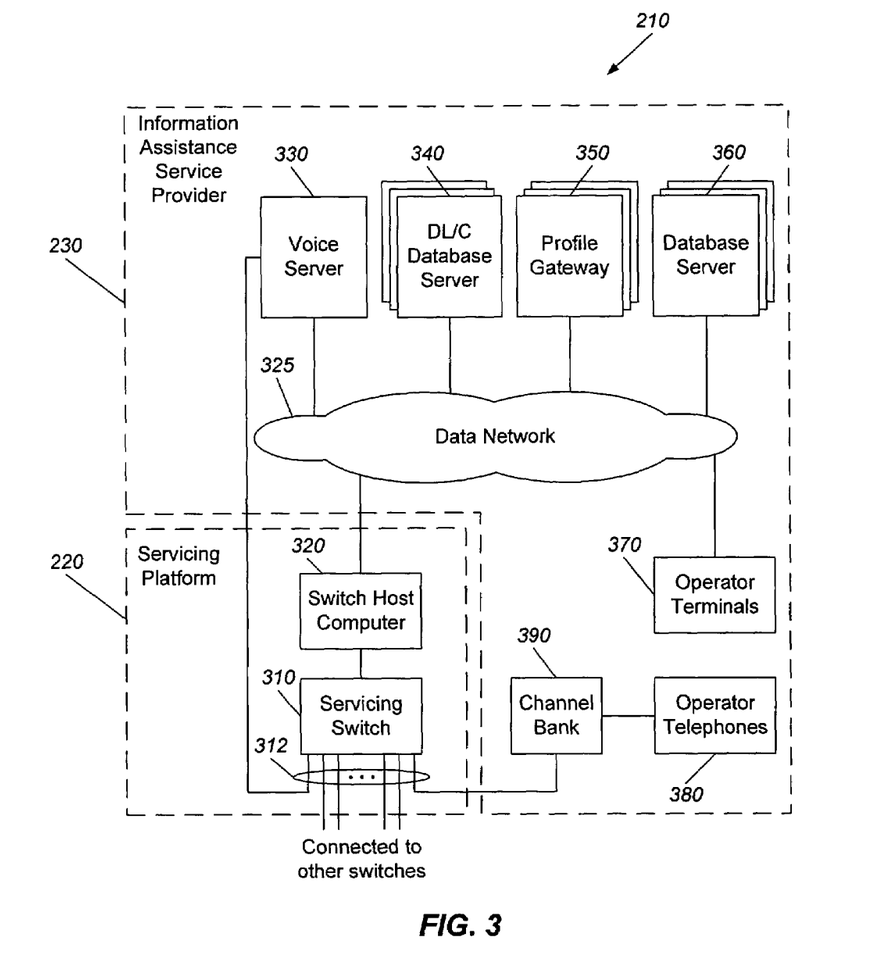
FIG. 3 illustrates an information assistance service provider and a servicing platform for providing an information assistance service.

FIG. 3 illustrates information/call center 210, which may be configured to include information assistance service provider 230 together with servicing platform 220. It should be noted that even though both service provider 230 and servicing platform 220 appear in the same figure, they may or may not be located in the same geographic area. Servicing platform 220 includes servicing switch 310 having T1 spans 312 for connection to voice server 330, channel bank 390, and one or more carrier networks. In an alternative embodiment, voice information may be packetized and transmitted pursuant to a voice over Internet protocol (VoIP) through a packet-switched network, e.g., the Internet, to information/call center 210. Servicing switch 310 may receive an incoming information assistance call from a carrier switch in a carrier network. Servicing switch 310 may also be used to place an outgoing call onto a carrier network, e.g., via switch 240, which may be different from the carrier network used for the incoming call.

Channel bank 390 in service provider 230 is used to couple multiple operator telephones 380 to servicing switch 310. The operators in information/call center 210 are further equipped with operator terminals 370, each of which includes a video display unit and a keyboard with an associated dialing pad. Operator terminals 370 are connected over data network 325 to one or more database servers 360, switch host computer 320, voice server 330, etc. By way of example, data network 325 includes a local area network (LAN) supplemented by a number of point-to-point data links.

Servicing switch 310 is conventional and supports digital T1 connectivity. The operation of servicing switch 310 is governed by instructions stored in switch host computer 320. In this illustrative embodiment, servicing switch 310 includes, among other things, arrays of digital signal processors (DSPs). These DSPs can be programmed and reprogrammed to function as, among other things, call progress analyzers (CPAs), call progress generators (CPGs), multi-frequency (MF) tone generators/detectors, voice recognizers, dual-tone multi-frequency (DTMF) generators/detectors, or conference units, depending on the demand placed on information/call center 210 and servicing switch 310 for each corresponding function.

An incoming information assistance call is received by servicing switch 310 in information/call center 210, which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 320 or elsewhere in information/call center 210. In other instances, other distribution logic may be utilized, such as skills-based routing or a priority scheme for preferred users. In a preferred embodiment, when the information assistance call is received by servicing switch 310 in information/call center 210, switch 310 derives, in a well-known manner, from the signaling associated with the call the caller's phone number from which the call originates, known as an ANI (automatic number identification). In addition, in order to keep track of the call, switch host computer 320 records the ANI of the incoming call, assigns a CSN (call sequence number) to the call, and associates that number with the port of switch 310 (or T1 span) through which the call is connected to information/call center 210.

Operators may use database server 360 to search for a caller's desired party and determine the appropriate destination number of the party. Other information assistance concerning restaurant recommendations, movie listings, events, etc. may also be provided by searching one or more of the internal and external databases, and the Internet.

Voice server 330 (also known as a "voice response unit" or "VRU") is used to play the constant repeated parts of an operator's speech, namely, the various greetings and signoffs (or closings). Voice server 330 is connected via data network 325 to switch host computer 320 and via one or more T1 spans 312 to servicing switch 310. Voice server 330 may comprise a general-purpose computer and one or more voice cards for voice recognition, voice recording and playback, and call progress analysis. At appropriate stages in a call progression, switch host computer 320 initiates a voice path connection between voice server 330 and servicing switch 310 such that the user, or the user and the operator, are able to hear whatever pre-recorded speech is played on that connection by voice server 330. Computer 320 then instructs voice server 330, via data network 325, what type of message to play, and passes data parameters that enable voice server 330 to locate the message appropriate to the call state.

Data network 325 may further connect to directory listing/concierge (DL/C) database server 340 and a profile gateway 350. DL/C database server 340 may contain directory listing information on restaurants, events, accommodations, transportation, travel information and booking, stock prices, weather, and other services such as grocery or flower delivery, etc. Together, DL/C database server 340 and database server 360 provide operators with the means to search for a caller's desired party and determine the appropriate telephone number. Preferably, these databases can search not only by name and address, but also by type of goods/services and/or geographical region, or by any other attribute in the caller record, including phone number. For example, DL/C database server 340 can answer queries soliciting the names/numbers of restaurants serving a desired cuisine on a given street.

Profile gateway 350 provides access to a user profile, which may include information about a subscriber to the information assistance service or customer service. Such information may include the subscriber's name, contact details (e.g., preferred phone number, fax number, and e-mail address), preferences (e.g., preferred restaurant and dining time, preferred mode of delivery of reservations), dietary requirements, likes and dislikes, past logged activities, etc. Switch host computer 320 requests via profile gateway 350 any profile identified by the ANI previously received. One embodiment of profile gateway 350 may include a data network interface, a communications interface, a processor, and memory. Profile data may be input and updated (e.g., via Internet web pages or operator) through a profile manager (not shown). In response to a request for a profile, the processor in the profile gateway searches the memory (which may include disks, caches, and volatile and nonvolatile memories) for the profile identified by the ANI.

If a profile is available, the profile data are served to switch host computer 320 and database servers 340 and 360. When the operator answers the call, server 360 communicates to the operator through terminal 370 any profile data pertinent to the handling of the call. The operator then interacts with the caller and uses server 360 to locate the requested listing. Once a listing is located, the relevant user preferences from the profile automatically populate the fields in an electronic request, e.g., for a restaurant reservation, on operator terminal 370, thereby reducing the need for interrogation by the operator.

Figure 4:
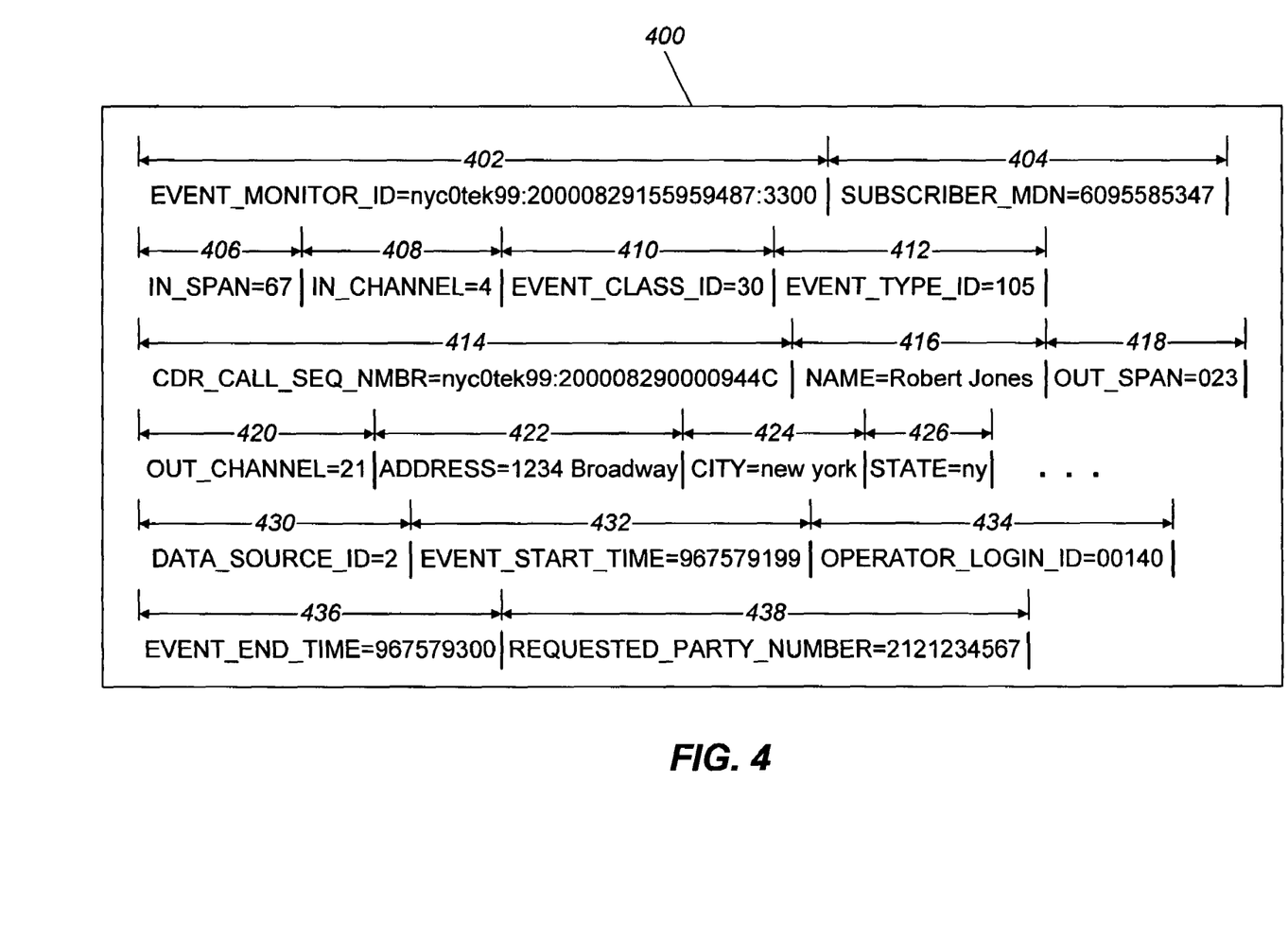
FIG. 4 is an example of a CDR for an information assistance call, including a name and an address of a requested party, in accordance with an embodiment of the present invention.

FIG. 4 illustrates an example of a CDR 400 that may be generated by database server 360 to document an information assistance search during an information assistance call. The CDR may include multiple fields describing an information assistance communication. Specifically, EVENT_MONITOR_ID field 402 contains a sequence of alphanumeric characters uniquely identifying CDR 400. SUBSCRIBER_MDN field 404 identifies the telephone number of the customer who made the information assistance call, i.e., the automatic number identification (ANI). IN_SPAN field 406 identifies the T1 span 312 transporting the incoming communication of the information assistance call. IN_CHANNEL field 408 identifies the channel (within the T1 span identified by IN_SPAN field 406), which the incoming communication of the information assistance call traverses.

EVENT_CLASS_ID field 410 is an optional field that may be used to identify a class of an event where CDRs are generated for multiple events, as described in U.S. application Ser. No. 09/777,061, mentioned above. For example, the value "30" in field 410 in this instance, corresponds to a SEARCHES class. Other values for field 410 may correspond, e.g., to CALL PROCESSING, VALUE ADDED SERVICE and LOCAL SERVICES classes. Another field, here EVENT_TYPE_ID field 412, specifies one of the event types within the class identified by the value in field 410. For example, the value "105" in field 412 in this instance corresponds to a search for a number of a requested party event within the SEARCHES class. Similarly, other values for field 410 correspond to different types of events in an identified class.

CDR_CALL_SEQ_NMBR field 414 contains the CSN (call sequence number) identifying the information assistance call in question. Multiple-event records generated in the same session to document different events taking place therein share the same value in field 414. In this way, a billing compiler may identify and compile event records related to the same session. CSNs are generated and assigned by switch host computer 320, when the information assistance call is initially received by servicing switch 310. Host computer 320 then transmits the CSN to switch 310 and any other component in information/call center 210 that may generate an event record. For example, the CSN for a call may be transmitted to operator terminal 370, voice server 330 and database server 360 to be incorporated in any CDR they generate, for that particular call session.

By knowing the CSN identifying the current call session, each component in information assistance service provider 230 (e.g., operator terminal 370, voice server 330 and database server 360) independently generates CDRs as it provides the data/services. The CDRs are correlated after the fact to provide a complete activity record for the call session whose data can be incorporated in a database. Thus, the advantage here is that components can be added to the system, new CDRs generated, or existing CDRs modified without having to alter any other component in the system or the database.

NAME field 416 contains the name of a requested destination party. As discussed above, terminal 370, database server 360, voice server 330 and/or switch host computer 320 may generate a CDR and populate NAME field 416. If the service provided by arrangement 200 is responding to a concierge request, an identifier of the concierge request, such as the type of goods or services requested or the name of the identified provider, may be inserted into NAME field 416. Alternatively, a separate field may be provided to identify concierge requests.

OUT_SPAN field 418 identifies the T1 span transporting the outgoing communication of the information assistance call, if any. OUT_CHANNEL field 420 identifies the channel (within the T1 span identified by field 418), which the outgoing communication of the information assistance call traverses, if the communication is connected to destination terminal 20, for example.

An optional ADDRESS field 422 may contain the address of the requested party. CITY field 424 contains the name of the city, such as New York, in which the requested party is located. STATE field 426 contains the name of the state in which the requested party is located. DATA_SOURCE_ID field 430 identifies the component of information/call center 210 generating CDR 400. EVENT_START_TIME field 432 indicates the start time of the communication event in question. The value shown in field 432 corresponds to a UNIX "epoch" time, i.e., the number of seconds elapsed since Jan. 1, 1970. Similarly, EVENT_END_TIME field 436 indicates the end time of the event in question. Thus, with such event start and end times, the duration of the event in question can be determined, which may be used in computing charges for that call session. OPERATOR_LOGIN_ID field 434 identifies the operator handling the event. REQUESTED_PARTY_NUMBER field 438 may contain the retrieved number of the requested party.

Records of events that occur during a call session may be correlated by the CSN, such as CDR_CALL_SEQ_NMBR field 414 in FIG. 4, identifying the call session. Each information assistance call is associated with customer information, such as ANI or SUBSCRIBER_MDN field 404 information as shown in FIG. 4, and/or a customer identification number assigned by the carrier.

Other fields, different fields, and fewer fields may be provided in CDR 400, as desired or needed by the communications system. CDR 400 includes information sufficient for describing an event, thereby facilitating computation of charges by a billing platform (not shown) for each call typically comprising multiple events.

As mentioned above, each CDR has associated with it the call sequence number. In one illustrative embodiment, one or more CDRs make up a "call segment," defined as a part of a call session that would be separately billed in the prior art (e.g., call to information assistance, call to destination party). The billing platform that produces bills for calls in accordance with the invention puts the CDRs together to make up these call segments and then puts the call segments together to make up a call session or a call. One example illustrating the use of call segments is shown in FIG. 5.

Figure 5:
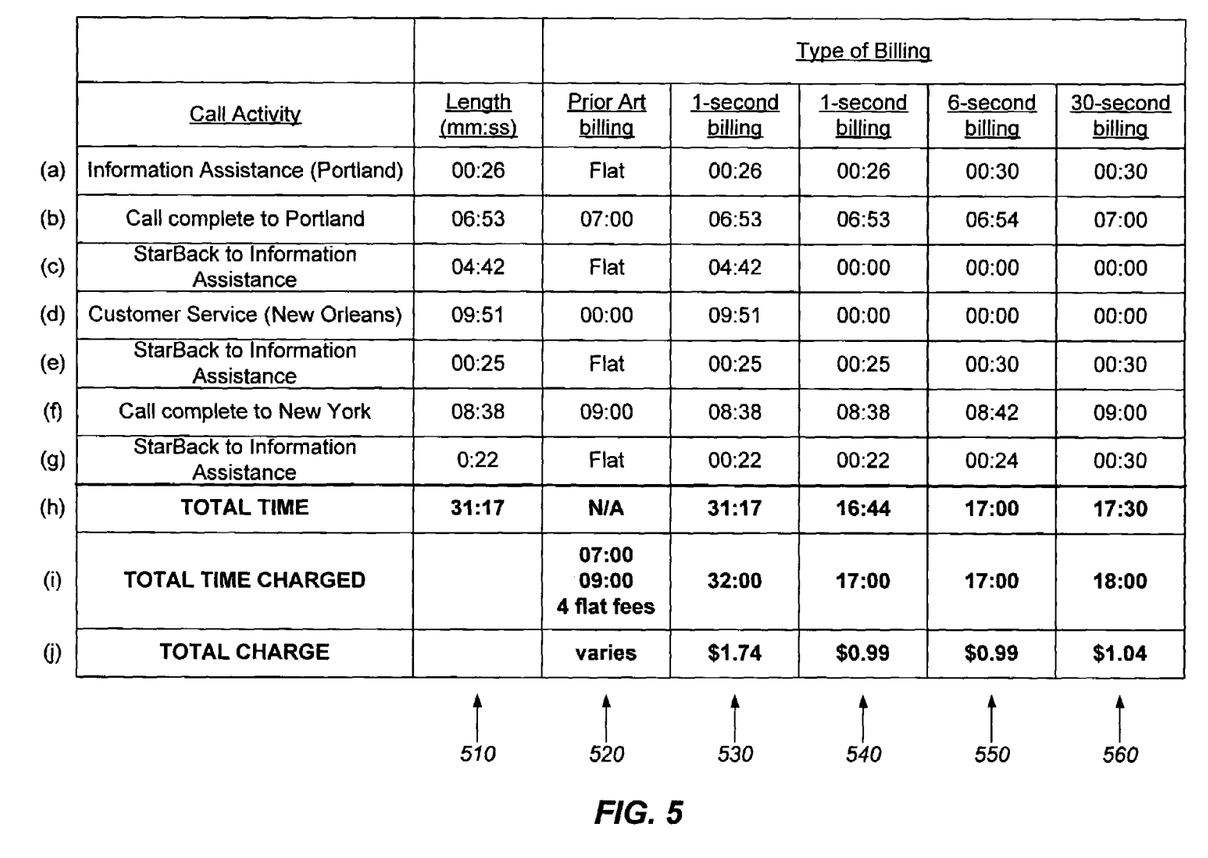
FIG. 5 is a table illustrating how a charge for a call is determined in accordance with an embodiment of the present invention.

The call illustrated in FIG. 5 is made up of seven call segments, labeled (a) through (g). An information assistance call by a caller in Portland typically is routed to the Portland information/call center, if any. As shown in FIG. 5, the call is made up of (a) an initial information assistance call segment; (b) a local call segment to a destination party in Portland, completed through the information assistance service provider; (c) a return to the information assistance service provider in Portland using the StarBack® feature and related conversation with the operator; (d) a transfer to customer service (e.g., to discuss a previous phone bill), located, e.g., in New Orleans, and the subsequent conversation with a customer service representative; (e) a return to the information assistance service provider in Portland using the StarBack® feature and related conversation with the operator; (f) a long distance call segment to a destination party in New York, completed through the information assistance service provider; and (g) a return to the information assistance service provider in Portland using the StarBack® feature and related conversation with the operator. FIG. 5 also shows in column 510 the length of each call segment, followed by column 520 showing the typical prior art method of charging the time and columns 530–560 showing different ways of charging the time according to the present invention.

As shown in column 520, in the prior art, each call segment would typically have been charged separately on the caller's phone bill, either on a per-call (i.e., flat) or per-minute basis. This would have likely included the following charges: (a) a flat charge for information assistance plus a flat charge to connect the next call segment; (b) a per-call or a per-minute charge for the local call segment to Portland, depending on the caller's calling plan, or possibly no charge, if local calls were free; (c) a flat charge for using StarBack® to return to information assistance, and a possible additional flat charge for information assistance; (d) probably no charge for the call segment to customer service; (e) probably no charge for being transferred back to information assistance using StarBack®, but a flat charge for information assistance plus a flat charge to connect the next call segment; (f) a per-minute charge for the long distance call segment to New York, again depending on the caller's calling plan; and (g) a flat charge for accessing StarBack® to information assistance, and a possible flat charge for information assistance (e.g., to access the caller's calendar). This results in a 7-minute local call segment, a 9-minute long distance call segment, and four or more flat charges for directory assistance, StarBack®, and connecting the call segments.

In contrast, the present invention treats the entire session on the caller's phone bill as a single call, and bills it according to the caller's calling plan. Assume the calling plan is 89¢ for the first 15 minutes, and 5¢ a minute, thereafter. Different billing scenarios are shown in columns 530–560. In column 530, the time is calculated according to 1-second billing (i.e., on an 1-second unit basis) for the entire call, with the resulting total rounded up to the next minute. The seven-segment call is 31:17 long, but is charged at 32:00, for a billing total of 89¢ for 15 minutes plus 85¢ for the next 17 minutes=$1.74. In column 540, the time is again calculated according to 1-second billing for the entire call, minus a call segment to customer service and the immediately preceding directory assistance call segment, with the resulting total rounded up to the next minute. The length for the five charged segments is 16:44, which is rounded up to 17:00, for a billing total of 89¢ for 15 minutes plus 10¢ for the next 2 minutes=$0.99. In column 550, the time is calculated according to 6-second billing (i.e., on a 6-second unit basis) for the entire call, minus the call segment to customer service and the immediately preceding directory assistance call segment, with the resulting total rounded up to the next minute. The length for the five charged segments is 17:00, which does not have to be further rounded, for a billing total of $0.99. In column 560, the time is calculated according to 30-second billing (i.e., on a 30-second unit basis) for the entire call, minus the call segment to customer service and the immediately preceding directory assistance call segment, with the resulting total rounded up to the next minute. The length for the five charged segments is 17:30, which is rounded up to 18:00, for a billing total of $1.04.

In addition to not charging for customer assistance call segments and the information assistance call segments immediately preceding them, there may be other no-charge call segments. These might include registration calls, for the call or call segment used to register with the information/call center as a subscriber; short calls or call segments, because some states may require that calls less than a certain duration (e.g., 24 seconds) do not get charged; call segments failing authentication (e.g., call segments to non-operating numbers or unanswered call segments); and toll-free (e.g., 1-800, 1-877, etc.) call segments. There may also be marketing promotions whereby, for example, the first five calls (i.e., sessions) are free. In order for the billing system to identify these no-charge call segments, each of these types of events would have a different EVENT_TYPE_ID which would be filled in the EVENT_TYPE_ID field in the CDRs associated with these call segments.

In addition, bundling call segments as a single call session creates novel changes in the way telephone taxes and surcharges may be calculated. In prior art, as shown in column 610 in FIG. 6, tax was charged on each separate call segment, with calls to information assistance and local calls charged intrastate taxes (if directory assistance was in-state) and long distance calls charged interstate taxes, based on the charges for each segment. In accordance with the present invention, a novel allocation scheme is used in which a local or long distance call segment is paired with the immediately preceding information assistance call segment to make a "tax segment." If a call segment to information assistance does not result in a local or long distance call, the tax segment is the same as the call segment. Taxes for each tax segment are determined by multiplying the total cost for the session by the time proportion of each tax segment during that session.

Figure 6:
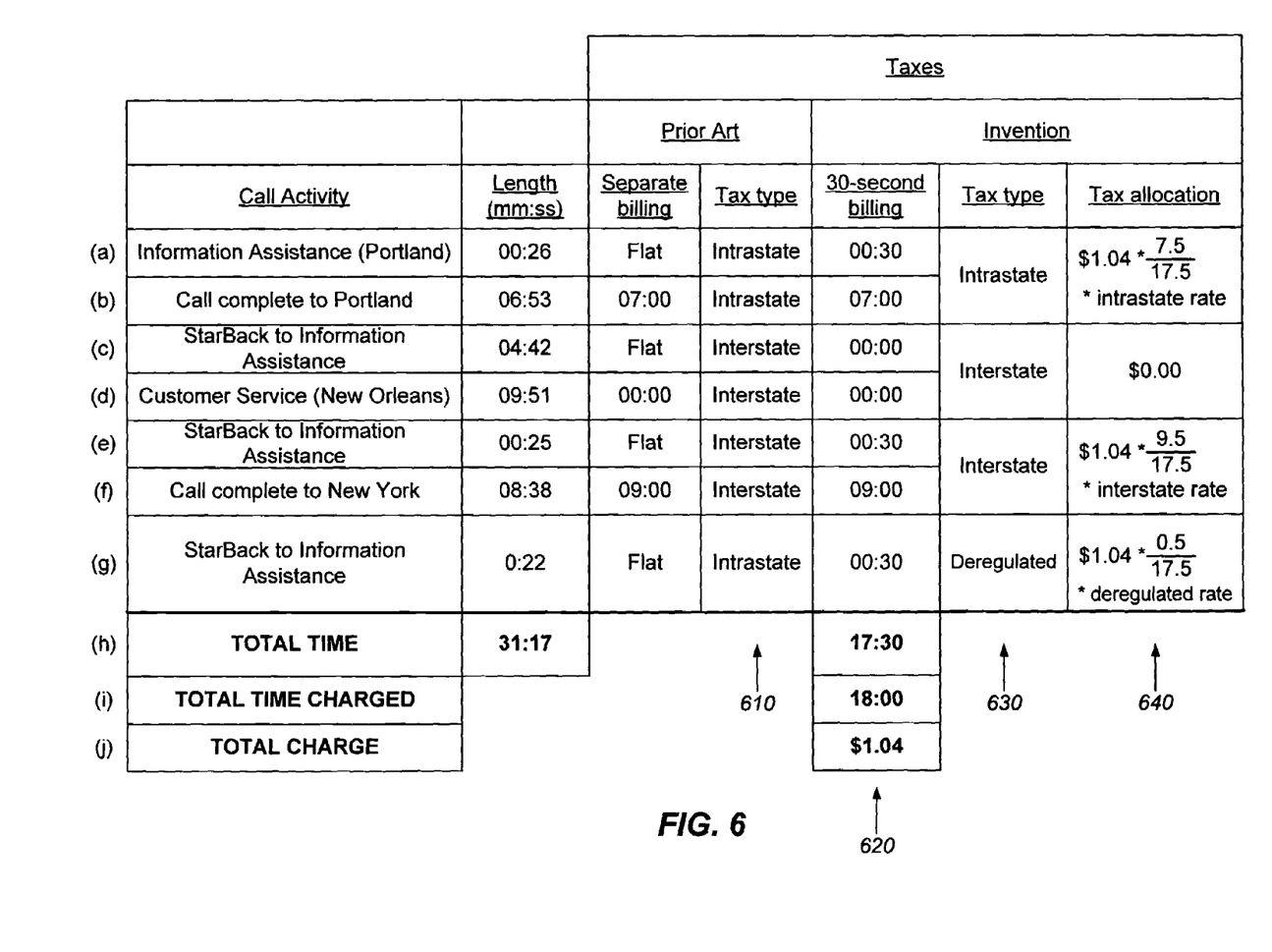
FIG. 6 is a table illustrating how different taxes are allocated to the call in accordance with an embodiment of the present invention.

Tax allocation is illustrated in FIG. 6, using the same seven-segment call discussed with reference to FIG. 5. Using 30-second billing, the length of the call is 17:30, shown in column 560 in FIG. 5 and repeated in column 620 in FIG. 6. The total cost for the call is $1.04. The seven-segment call in FIG. 6 is divided into four tax segments, based on call segment (b) to Portland, call segment (d) to customer service, call segment (f) to New York, and call segment (g) to information assistance. The first tax segment includes call segment (b), a local call to Portland, and its immediately preceding directory assistance call, call segment (a), and this tax segment is taxed at an intrastate rate, i.e., that of Oregon, as shown in column 630. The second tax segment includes call segment (d), a long distance call segment to customer service, and its immediately preceding information assistance call segment, call segment (c), and this tax segment is taxed at an interstate rate. The third tax segment includes call segment (f), a long distance call segment to New York, and its immediately preceding information assistance call segment, call segment (e), and this tax segment is taxed at an interstate rate. The fourth tax segment includes only call segment (g), information assistance, and is taxed at a deregulated tax rate.

The tax for each tax segment, shown in column 640, is calculated by multiplying the total cost for the call, $1.04, by the time proportion of the tax segment out of the whole 17:30 call, by the applicable tax rate. The time for the first tax segment is 7:30, so the tax for this tax segment=$1.04*7.5/17.5*intrastate tax rate=$1.04*0.4289*intrastate tax rate. Note that because no revenue is generated by the tax segment comprising call segments (c) and (d), the time for that tax segment is not considered in the calculations. The time for the third tax segment is 9:30, so the tax for this tax segment=$1.04*9.5/17.5*interstate tax rate=$1.04*0.5429*interstate tax rate. The time for the fourth tax segment is 0:30, so the tax for this tax segment=$1.04*0.5/17.5*deregulated tax rate=$1.04*0.0286*deregulated tax rate.

Disclosed herein is a novel concept in billing a series of call segments. Instead of separately billing every call that goes through a carrier switch, such as carrier switch 240, the present invention treats as a single call the entire time that connection 215 between caller terminal 10 and information/call center 210 is maintained. During this call, many different activities take place, each one generating a CDR, and the activities are associated with each other by way of the call sequence number assigned when connection 215 is first made. In this way, the call session may be billed at a flat rate, or a bundled rate, or even a per-minute rate, regardless of how many separate connections are made and torn down between the information/call center and destination terminals.

Additional advantages and modifications will readily occur to those skilled in the art. Therefore, the present invention in its broader aspects is not limited to the specific embodiments, details, and representative devices shown and described herein. Accordingly, various changes, substitutions, and alterations may be made to such embodiments without departing from the spirit or scope of the general inventive concept as defined by the appended claims.

What is claimed is:

1. A method for use by a service provider for providing at least an information assistance service, comprising:
   receiving a call by a caller which includes at least one information assistance request, the call being realized by a connection from a first terminal associated with the caller to the service provider;
   assigning an identifier to the call;
   in response to the request, searching for a desired telephone number;
   connecting the first terminal to a second terminal associated with the desired telephone number without terminating the connection;
   generating a plurality of records for activities in a session during which the connection is maintained, the records including the identifier therein;
   associating the records based on the identifier therein; and
   determining a charge for the session based on selected ones of the records.

2. The method according to claim 1, further comprising dividing the session into call segments based on information in the selected records.

3. The method according to claim 2, further comprising dividing the session into tax segments based on information in the selected records.

4. The method according to claim 2, wherein an amount of a charge for the call is based on the length of the session.

5. The method according to claim 2, wherein an amount of a charge for the call is based on the durations of call segments and the number of call segments.

6. The method according to claim 3, wherein if a first call segment comprising an information assistance service is followed by a second call segment comprising a connection to the second terminal, a tax segment comprises the first and second segments.

7. The method according to claim 3, wherein if a first call segment comprising an information assistance service is not followed by a second call segment comprising a connection to the second terminal, a tax segment comprises the first segment only.

8. The method according to claim 3, wherein a tax charged on the call is based on the time proportion of each tax segment compared to the time of the session.

9. The method according to claim 6, wherein the tax segment is charged tax at a selected tax rate if the first terminal is in a calling area different from the second terminal.

10. The method according to claim 9, wherein the tax segment is charged tax at a second tax rate if the first terminal is in the same calling area as the second terminal.

11. The method according to claim 1, wherein the call includes a second request for customer service.

12. The method according to claim 1, wherein the call includes a second request for a concierge-type service for providing information concerning a supplier of desired goods or services.

13. The method according to claim 12, wherein the concierge-type service includes making a reservation with the supplier.

14. The method according to claim 1, wherein a database is searched for the desired telephone number.

15. A system for providing at least an information assistance service by a service provider, comprising:
    an interface for receiving a call by a caller which includes at least one information assistance request, the call being realized by a connection from a first terminal associated with the caller to the service provider, the call being assigned an identifier;
    a database server responsive to the request for searching for a desired telephone number, the first terminal being connected to a second terminal associated with the desired telephone number without terminating the connection;
    one or more devices for generating a plurality of records for activities in a session during which the connection is maintained, the records including the identifier therein; and
    a processor for associating the records based on the identifier therein, a charge for the session being determined based on selected ones of the records.

16. The system according to claim 15, wherein the session is divided into call segments based on information in the selected records.

17. The system according to claim 16, wherein the session is divided into tax segments based on information in the selected records.

18. The system according to claim 16, wherein an amount of a charge for the call is based on the length of the session.

19. The system according to claim 16, wherein an amount of a charge for the call is based on the durations of call segments and the number of call segments.

20. The system according to claim 17, wherein if a first call segment comprising an information assistance service is followed by a second call segment comprising a connection to the second terminal, a tax segment comprises the first and second segments.

21. The system according to claim 17, wherein if a first call segment comprising an information assistance service is not followed by a second call segment comprising a connection to the second terminal, a tax segment comprises the first segment only.

22. The system according to claim 17, wherein a tax charged on the call is based on the time proportion of each tax segment compared to the time of the session.

23. The system according to claim 20, wherein the tax segment is charged tax at a selected tax rate if the first terminal is in a calling area different from the second terminal.

24. The system according to claim 23, wherein the tax segment is charged tax at a second tax rate if the first terminal is in the same calling area as the second terminal.

25. The system according to claim 15, wherein the call includes a second request for customer service.

26. The system according to claim 15, wherein the call includes a second request for a concierge-type service for providing information concerning a supplier of desired goods or services.

27. The system according to claim 26, wherein the concierge-type service includes making a reservation with the supplier.

* * * * *